US005355287A

United States Patent [19]
Denley

[11] Patent Number: 5,355,287
[45] Date of Patent: Oct. 11, 1994

[54] HEADLAMP ADJUSTER WITH SEALED ADJUSTING LINK

[75] Inventor: Ronald S. Denley, Woodstock, Ill.

[73] Assignee: Elco Industries, Inc., Rockford, Ill.

[21] Appl. No.: 209,416

[22] Filed: Mar. 10, 1994

[51] Int. Cl.⁵ .............................................. B60Q 1/06
[52] U.S. Cl. ...................................... 362/66; 362/421;
362/422; 74/89.13; 74/89.15
[58] Field of Search ............... 362/661, 421, 422, 423,
362/424, 428, 267; 74/89.13, 89.15, 417, 459.5

[56] References Cited

U.S. PATENT DOCUMENTS

| | | | |
|---|---|---|---|
| 4,703,399 | 10/1987 | Van Duyn et al. | 362/66 |
| 4,939,945 | 7/1990 | Ryder et al. | 362/66 X |
| 5,214,971 | 1/1993 | Burton et al. | 362/66 X |
| 5,309,780 | 5/1994 | Schmitt | 362/66 X |

*Primary Examiner*—Stephen F. Husar
*Attorney, Agent, or Firm*—Leydig, Voit & Mayer

[57] ABSTRACT

A vehicular headlamp component is pivotally adjusted in response to back or forth movement of an adjusting link extending through an opening in one wall of a two-component housing of an adjusting device. Back and forth movement of the link is produced by a gear driven bushing which is threaded onto the link. An O-ring encircles the link between the bushing and the housing wall and is adapted to be compressed against the wall and the link thereby to seal the opening in the wall and prevent contamination from passing through the opening and into the housing of the headlamp. Compression of the O-ring is effected by camming the bushing toward the housing wall as an incident to assembly of the two housing components with one another.

10 Claims, 2 Drawing Sheets

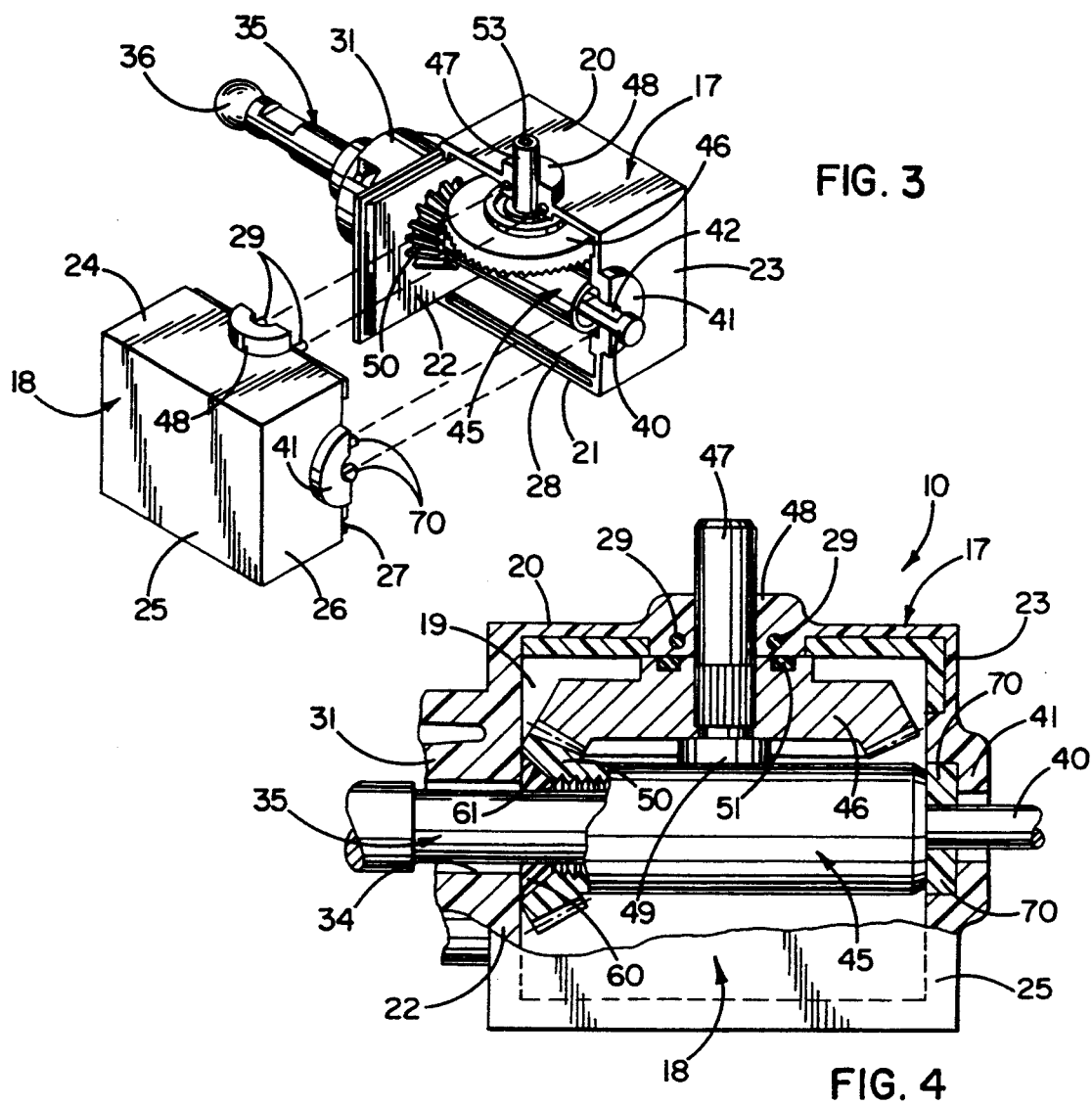
FIG. 3
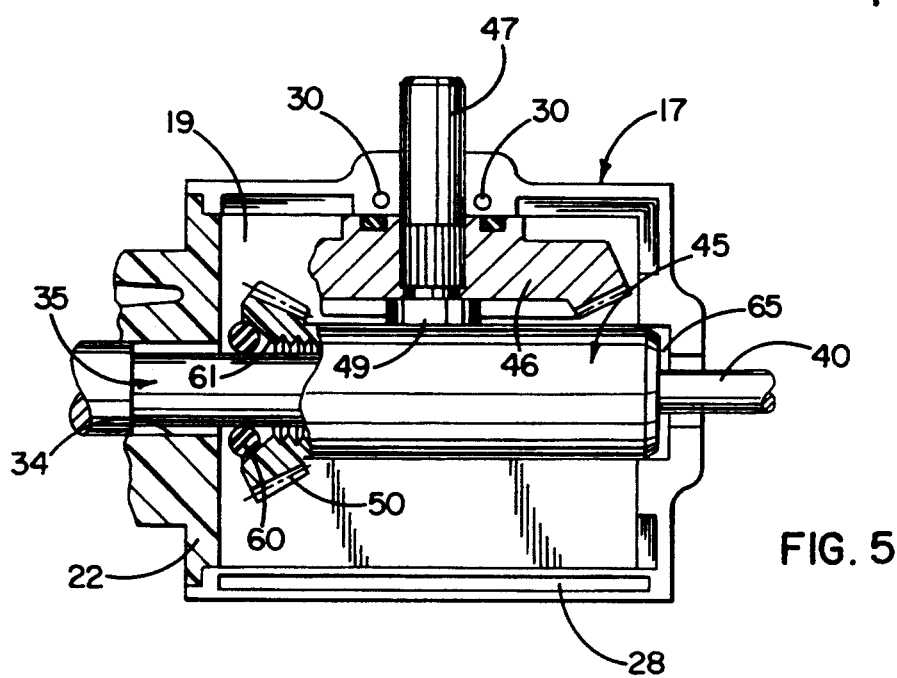
FIG. 4
FIG. 5

HEADLAMP ADJUSTER WITH SEALED ADJUSTING LINK

BACKGROUND OF THE INVENTION

This invention relates to a device for adjusting a vehicular headlamp component in order to effect proper aiming of the headlamp beam.

A typical prior art headlamp adjusting device is disclosed in Burton et al U.S. Pat. No. 5,214,971. That device includes a housing defining a chamber which receives an internally threaded tubular bushing. An externally threaded adjusting link extends into the chamber through an opening in one end of the housing and is threaded into the bushing, the link being connected to the headlamp component and being held against rotation. When the bushing is rotated, the link moves back or forth within the opening in the housing and effects adjustment of the headlamp component. Rotation of the bushing is effected by a bevel gear having an actuating stem projecting from the housing and adapted to be turned manually.

The housing of the adjusting device usually is mounted exteriorly of the headlamp and is exposed to moisture, dirt and other contamination. In certain types of headlamps, the adjusting link projects into the headlamp housing itself and is connected to a reflector which is moved by the link in order to aim the beam of the headlamp. Moisture, dirt and the like may enter the exposed adjusting device housing and it is important to prevent such contamination from passing along the adjusting link and into the headlamp housing.

SUMMARY OF THE INVENTION

The general aim of the present invention is to provide a new and improved headlamp adjusting device having a housing which is uniquely sealed adjacent the adjusting link in order to prevent contamination in the housing of the adjusting device from passing out of the housing along the link and into the housing of the headlamp.

A more detailed object of the invention is to achieve the foregoing by providing an adjusting device in which a sealing ring encircles the adjusting link and is compressed into sealing engagement with the link and the end wall of the adjusting device housing in order to seal the opening in the end wall.

Still another object of the invention is to utilize the tubular bushing of the adjusting device to compress the sealing ring, the compression being effected during final assembly of the housing components of the adjusting device.

These and other objects and advantages of the invention will become more apparent from the following detailed description when taken in conjunction with the accompanying drawings.

BRIEF DESCRIPTION OF THE DRAWINGS

FIG. 3 is a perspective view showing the two components of the adjusting device housing in exploded relation.

FIG. 4 is a view generally similar to FIG. 2 but on an enlarged scale.

FIG. 5 is a view generally similar to FIG. 4 but shows the adjusting device before final assembly of two housing components.

Figure 1:
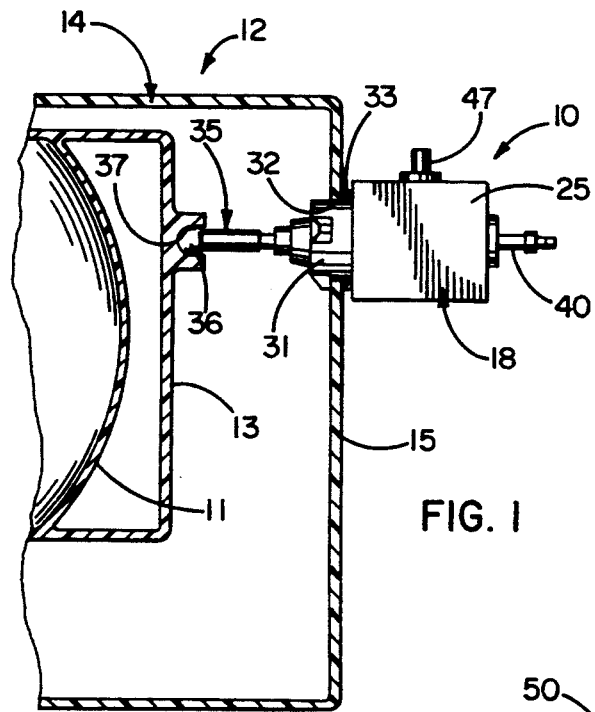
FIG. 1 is a side elevational view of a new and improved adjusting device incorporating the unique features of the present invention and shows the device connected to a vehicular headlamp, which has been illustrated in somewhat schematic cross-section.

While the invention is susceptible of various modifications and alternative constructions, a certain illustrated embodiment hereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

DETAILED DESCRIPTION OF THE PREFERRED EMBODIMENT

For purposes of illustration, the invention has been shown in the drawings as embodied in a device 10 for adjusting a component 11 of a vehicle headlamp 12 in order to effect proper aiming of the headlamp beam. In this particular instance, the component 11 which has been shown as being adjustable is a reflector carried by a mounting bracket 13 which, in turn, is pivotally supported within an enclosed housing 14 which forms part of the overall headlamp 12. The adjusting device 10 is mounted on the rear wall 15 of the housing 14 and herein serves to pivot the reflector 11 upwardly or downwardly about a laterally extending axis in order to establish the vertical aim of the headlamp beam. It should be understood, however, that the device 10 could be used to adjust the reflector about an upright axis and thereby establish the horizontal aim of the beam.

Herein, the adjusting device 10 includes a housing formed by two injection molded plastic housing components 17 and 18 (FIG. 3) which, when assembled together, cause a box-like chamber 19 (FIG. 4) to be defined within the housing. For convenience, the housing component 17 will be referred to as being a base while the housing component 18 will be referred to as being a cover.

The housing base 17 is a box-like member formed with a top wall 20 (FIG. 3), a bottom wall 21, a side wall (not visible) and front and rear end walls 22 and 23. The top and bottom walls 20 and 21 and the rear end wall 23 all have the same lateral dimension and thus have edges all disposed in a common plane and defining an open side for the base 17. The front end wall 22, however, has a substantially longer lateral dimension than the other three walls and projects laterally beyond the open side of the base 17.

As shown most clearly in FIG. 3, the cover 18 also is generally a box-like member having a top wall 24, a bottom wall (not visible), a side wall 25 and a rear end wall 26, the side of the cover opposite the side wall 25 being open. The cover 18 does not include a front end wall as such and thus the front of the cover is open until the cover is assembled with the base 17, at which time the front of the cover is closed by the elongated front end wall 22 of the base. Assembly of the cover and the base is effected by placing the two together. The cover is formed with various ribs (e.g., the rib 27 in FIG. 3)

which fit into various grooves (e.g., the groove 28) in the base to help hold the cover and the base in releasably assembled relation. In addition, the cover is formed with a pair of laterally extending pins 29 (FIGS. 3 and 4) which telescope into holes 30 (FIG. 4) in the base. Once the cover and base have been fitted together, an ultrasonic weld joint is established along various mating surfaces defining the seam between the cover and the base.

A forwardly projecting mounting nose 31 (FIGS. 1 and 3) is molded integrally with the forward end wall 22 of the base 17 and is adapted to extend forwardly through a hole 32 in the rear wall 15 of the headlamp housing 14. The nose and the hole are shaped such that the nose interlocks with the edges of the hole much in the manner of a bayonet coupling once the nose has been inserted through the hole and turned through sixty degrees. To prevent water and other contaminants from entering the headlamp housing 14 through the hole 32, an O-ring 33 encircles the rear end of the nose 31 and becomes compressed between the walls 15 and 22 when the adjusting device 10 is attached to the wall 15.

An opening 34 (FIG. 4) is formed through the front end wall 22 and the nose 31 and accommodates an adjusting link 35. The latter is a rod-like member whose forward end is formed with a spherical ball 36 adapted to be pivotally received in a similarly shaped socket 37 formed on the rear side of the mounting bracket 13 of the reflector 11. When the link is shifted forwardly and rearwardly, it acts through the bracket to pivot the reflector downwardly and upwardly, respectively, as needed to establish proper vertical aim of the headlamp beam.

Figure 2:
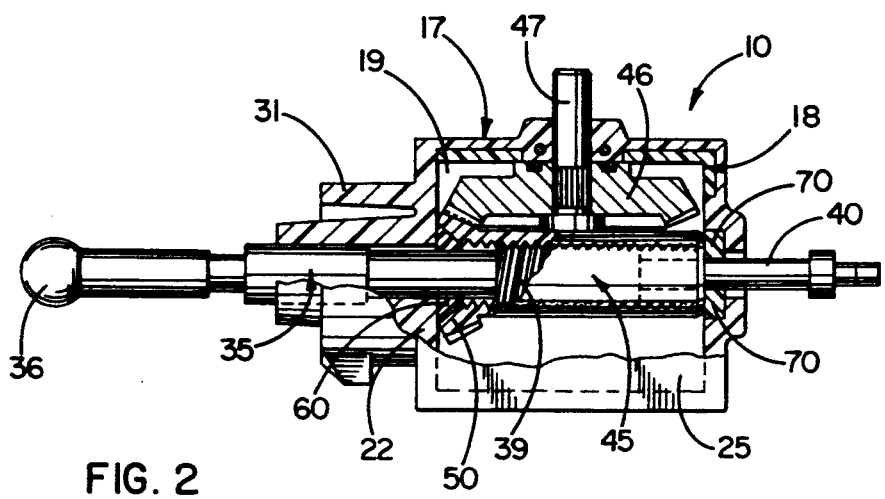
FIG. 2 is an enlarged view of the adjusting device illustrated in FIG. 1 with certain parts being broken away and shown in section.

The adjusting link 35 includes an externally threaded intermediate portion 39 (FIG. 2) which is located in the housing chamber 19. Formed integrally with and extending rearwardly from the threaded portion 39 is a reduced-diameter link portion 40 which extends rearwardly out of the chamber. The rearwardly extending link portion 40 is guided slidably by bearing surfaces formed by hubs 41 on the rear end walls 23 and 26 and defining an opening for the link portion 40 when the cover 18 is assembled to the base 17. Flats 42 (FIG. 3) are formed on diametrically opposite sides of the link portion 40 and coact with the bearing hub 41 of the cover 18 to prevent the adjusting link 35 from rotating.

In order to produce back and forth linear shifting of the link 35 for purposes of adjusting the reflector 11, an internally threaded tubular member or bushing 45 is located in the housing chamber 19 and is screwed onto the externally threaded portion 39 of the link. The bushing 45 preferably is molded of plastic and either is formed with molded threads or with threads which are cut into the plastic when the threaded portion 39 of the link 35 is first screwed into the bushing. Rotation of the bushing in one direction causes the link 35 to advance forwardly while rotation of the bushing in the opposite direction effects retraction of the link.

In order to rotate the bushing 45, a bevel gear 46, which preferably is made of metal, is pressed onto the lower end of an adjusting stem or shaft 47 which extends upwardly out of the housing chamber 19. The top walls 20 and 24 of the base 17 and the cover 18 are formed with bearing hubs 48 (FIG. 3) which define an opening for accommodating the shaft when the cover is assembled with the base. The lower end of the shaft is formed with a head 49 (FIG. 4) which engages the upper side of the bushing 45.

Figure 6:
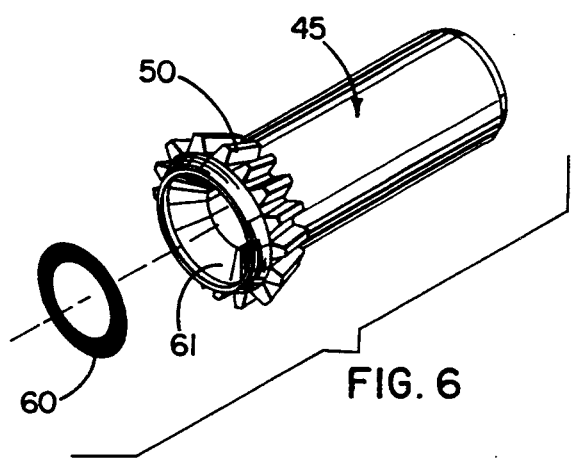
FIG. 6 is an exploded perspective view of the tubular bushing and the sealing ring.

The lower periphery of the bevel gear 46 is formed with angularly spaced teeth which mesh with similar teeth of a bevel gear 50 (FIG. 6) molded integrally with the forward end portion of the bushing 45. An O-ring 51 (FIG. 4) is compressed between the upper side of the bevel gear 46 and the lower sides of the hubs 48 to form a frictional coupling between the gear and the housing components 17, 18 and prevent free rotation of the gear. In addition, the O-ring 51 seals off the opening defined by the hubs 48. Compression of the O-ring is effected by virtue of the head 49 of the shaft 47 engaging the bushing 45 and forcing the O-ring against the hubs.

The upper end of the shaft 47 is formed with a socket 53 (FIG. 3) for receiving a driving tool (not shown) for manually turning the shaft. When turned, the shaft causes the gear 46 to act through the gear 50 to rotate the bushing 45 and thereby produce linear shifting of the link 35 for purposes of adjusting the reflector 11.

Even though the cover 18 is ultrasonically welded to the base 17, there still is a possibility that water, dirt and other contamination can enter the chamber 19 through the seam and especially through the opening defined by the bearing hubs 41 for the rear end portion 40 of the link 35. It is important to prevent any contamination in the adjuster chamber 19 from entering the headlamp housing 14 and causing possible malfunction of the headlamp 12.

In accordance with the present invention, a resiliently yieldable sealing gasket 60 is compressed against the end wall 22 and the link 35 and serves to seal the opening 34 in the end wall so as to preclude any contamination in the adjuster chamber 19 from passing through the opening and into the headlamp housing 14. Herein, the sealing gasket 60 is an elastomeric O-ring which is located between the rear side of the end wall 22 and the forward end of the bushing 45. Importantly, the O-ring is adapted to seat within a pocket 61 (FIG. 6) formed in the forward end of the bushing 45. The pocket is defined by a frustoconical surface located generally internally of the bevel gear 50 and shaped so as to flare or increase in diameter upon progressing toward the end wall 22. When the bushing 45 is pushed axially toward the end wall 22, the frustoconical surface of the pocket 61 engages the O-ring 60 and compresses the latter axially against the end wall and radially inwardly against the link 35. As a result, the O-ring is converted from a circular cross-sectional shape (FIG. 5) to a generally triangular cross-sectional shape (FIG. 4) and establishes a seal of high integrity at the opening 34 in the end wall 22.

The manner of assembling the components of the adjuster 10 and compressing the O-ring 60 now will be explained. First, the tubular bushing 45—with the O-ring 60 seated in the pocket 61—is placed in the base 17 with the bushing located in alignment with the opening 34 in the end wall 22. The link 35 then is inserted rearwardly into the opening 34 and is threaded into and through the bushing until the rear end portion 40 of the link protrudes out of the rear end of the bushing and rests in the bearing hub 41 of the base 17. At this point of the assembly process, the rear end of the bushing 45 is spaced forwardly from the bearing hub 41 of the base 17 (as indicated by the gap 65 in FIG. 5) and the O-ring 60 is in an uncompressed state and is spaced from the end wall 22.

The bevel gear 46 with the shaft 47 attached thereto then is placed in the base 17 with the gear resting on the bushing 45 and with the shaft received within the opening defined by the bearing hub 48 of the base. Thereafter, the cover 18 is moved into assembled relation with the base 17. As an incident thereto, a pair of vertically spaced tabs 70 (FIGS. 3 and 4) move into the gap 65, engage the rear end of the bushing 45 and cam the bushing forwardly from the position shown in FIG. 5 to the position shown in FIG. 4 so as to cause the frustoconical surface of the pocket 61 to engage the O-ring 60 and compress the latter against the end wall 22 and the link 35. The tabs 70 are formed integrally with and extend laterally from the rear end wall 26 of the cover 18 and, in the installed position of the cover, straddle the rear end portion 40 of the link 35 and engage the flats 42 thereof so as to coact with the bearing hub 41 of the cover in preventing rotation of the link.

As the final step in the assembly process, the cover 18 is ultrasonically welded to the base 17.

From the foregoing, it will be apparent that the present invention brings to the art a new and improved headlamp adjusting device 10 in which an O-ring 60 is associated with the bushing 45 and is compressed against the end wall 22 and the link 35 when the bushing is cammed forwardly by the tabs 70 as an incident to assembly of the cover 18 with the base 17. The compressed O-ring prevents contamination from passing along the link 35 and through the opening 34 in the end wall 22 and thus prevents such contamination from entering the headlamp housing 14.

I claim:

1. A device for adjusting a headlamp component, said device comprising a housing defining a chamber having an end wall, an opening in said end wall, an elongated link having a first end portion extending into said chamber through said opening and having a second end portion adapted for connection to said headlamp component, means for moving said link back and forth within said opening to effect adjustment of said headlamp component, said means comprising a tubular member disposed within said chamber and receiving said first end portion of said link, a resiliently yieldable sealing ring encircling said link and located in said chamber between said tubular member and said end wall, and means pressing said tubular member toward said end wall thereby to cause said sealing ring to become compressed between said tubular member, said end wall and said link to seal off said opening.

2. A device as defined in claim 1 in which said tubular member includes a first end portion located adjacent said end wall and having a pocket with a generally frustoconical surface, said sealing ring being located within said pocket, said frustoconical surface flaring outwardly away from said link upon progressing toward said end wall and acting to compress said sealing ring axially against said end wall and radially inwardly against said link when said tubular member is pressed toward said end wall.

3. A device as defined in claim 2 in which said first end portion of said link includes an external thread, said tubular member having an internal thread operably coupled to said external thread whereby rotation of said tubular member causes said link to move linearly within said opening.

4. A device as defined in claim 3 further including a first gear formed integrally with said first end portion of said tubular member, and a second gear disposed within said chamber in meshing engagement with said first gear and operable when rotated to effect rotation of said first gear.

5. A device as defined in claim 4 in which said pocket is located radially inwardly of said first gear.

6. A device as defined in claim 4 further including a shaft extending rotatably into said housing and having an end engaging said tubular member, said second gear being rotatable with said shaft, and an O-ring compressed between said second gear and said housing and frictionally retarding rotation of said second gear.

7. A device as defined in claim 1 in which said housing includes first and second separately formed housing components adapted to be assembled to one another to form said chamber, said end wall being integral with said first housing component, and said pressing means comprising means integral with said second housing component and operable to cam said tubular member toward said end wall as an incident to said housing components being assembled to one another.

8. A device as defined in claim 7 in which said integral means comprise a pair of spaced tabs, said tabs engaging one end of said tubular member and straddling said link when said housing components are assembled to one another.

9. A device for adjusting a headlamp component, said device comprising first and second housing components adapted to be assembled to one another to define a chamber, said first housing component having an end wall with an opening formed therethrough and communicating with said chamber, said first housing component also having a bearing surface spaced from said end wall, an elongated link having a first end portion extending into said chamber through said opening and supported at least partially by said bearing surface, said link having a second end portion adapted for connection to said headlamp component, at least a section of the first end portion of said link being externally threaded, an internally threaded tubular bushing disposed in said chamber and threaded onto said first end portion of said link whereby rotation of said bushing causes said link to move back and forth within said opening to adjust said headlamp component, a resiliently yieldable sealing ring encircling said link and located in said chamber between said bushing and said end wall, and means on said second housing component pressing said bushing toward said end wall thereby to cause said sealing ring to become compressed between said bushing, said end wall and said link to seal off said opening.

10. A device as defined in claim 9 in which said bushing includes a first end portion located adjacent said end wall and having a pocket with a generally frustoconical surface, said sealing ring being located within said pocket, said frustoconical surface flaring outwardly away from said link upon progressing toward said end wall and acting to compress said sealing ring axially against said end wall and radially inwardly against said link when said bushing is pressed toward said end wall.

* * * * *